United States Patent Office 2,966,513
Patented Dec. 27, 1960

2,966,513

PRODUCTION OF NAPHTHALENE DICARBOXYLIC ACIDS

Ellis K. Fields, Chicago, Ill., assignor to Standard Oil Company, Chicago, Ill., a corporation of Indiana No Drawing. Filed July 1, 1957, Ser. No. 668,859

4 Claims. (Cl. 260—523)

This invention relates to an improved process for preparing naphthalene polycarboxylic acids and their anhydrides by oxidation of acenaphthene compounds. More specifically the invention relates to a process for oxidizing acenaphthene compounds by means of molecular oxygen in the presence of metallic oxidation catalysts and bromine as a co-catalyst. A specific aspect of the invention relates to the production of 1,8-naphthalic acid by the oxidation of acenaphthene.

Naphthlene polycarboxylic acids are commercially valuable organic compounds which have wide use in the preparation of dyestuffs. The naphthalene carboxylic acids or their anhydrides may be reacted with high boiling monohydric alcohols to give useful plasticizers for resins and polymers; they may be condensed with polyhydric alcohols such as ethylene glycol, pentaerythritol and glycerine to give fiber formers and alkyd resins.

It has been proposed heretofore to oxidize acenaphthene and acenaphthene derivatives to naphthalene polycarboxylic acids such as naphthalic acid by means of chromic acid or its salts in acidic media, by means of potassium permanganate, and the like. These methods have invariably depended upon the action of chemical oxidants and have been attended by relatively high expense, low yields, and difficulty in isolation of the pure carboxylic acids desired.

It has been found that acenaphthene compounds, for example unsubstituted acenaphthene and substituted acenaphthenes having aliphatic substituents of from 1 to 4 carbon atoms attached to the naphthalene nucleus can be readily and conveniently oxidized to naphthalene polycarboxylic acids by heating in contact with molecular oxygen at elevated temperatures above 150° C. in the presence of a catalytic amount of a catalyst system containing metallic oxidation catalyst and a bromine. I have now discovered that in the oxidation of acenaphthene or substituted acenaphthenes with the aforesaid catalyst system that the oxidation reaction, as indicated by the absorption of oxygen by the reaction mixture, must be carried substantially beyond the point at which the oxygen content of the contacting gases becomes essentially constant in order to obtain a substantial yield of the desired naphthalene polycarboxylic acid.

While I do not wish to be bound by any theory regarding the course of the oxidation reaction, it appears that in the oxidation of naphthalene compounds containing a peri-ethylene substituent, oxidation products such as ketones are formed which undergo self-condensation reactions resulting in the formation of black, insoluble intermediates. These intermediate oxidation products must then be further subjected to contact with oxygen containing gases in order to convert the material into the desired polycarboxylic acids.

Briefly then, my invention comprises an improved process for the preparation of naphthalene polycarboxylic acids from acenaphthene or substituted acenaphthenes wherein the material to be oxidized is first contacted with molecular oxygen-containing gases in the liquid phase at an elevated temperature until the oxygen content of the gases in contact with the reaction mixture is essentially constant, and thereafter further contacting said reaction mixture with a further quantity of molecular oxygen-containing gases for a period of from about 0.5 to about 4 hours until no further oxygen absorption occurs, and the naphthalene polycarboxylic acid so produced. In a preferred embodiment of my invention the oxidation of the acenaphthene compound is conducted in a solvent comprising a lower aliphatic monocarboxylic acid having from 2 to 8 carbon atoms in the molecule.

Acenaphthene compounds oxidized to naphthalene polycarboxylic acids in accordance with the invention comprise both unsubstituted acenaphthene and substituted acenaphthenes having oxidizable aliphatic substituents of from 1 to 4 carbon atoms attached to the naphthalene ring. Such substituents may be alkyl groups of from 1 to 4 carbon atoms, for example methyl, ethyl, isopropyl and the like or may comprise aliphatic bifunctional groups attached to two different aromatic carbon atoms, for example, bi-acenaphthene, peri-acenaphthenindandion (prepared for example by the method of U.S. Patent 1,612,103 of W. Eckert) and the like. The latter compound is particularly valuable for the preparation of 1,4,5,8-naphthalene-tetrapolycarboxylic acid which is a particularly valuable dyestuff intermediate.

The oxidation is desirably conducted in the presence of a solvent medium which is preferably a monocarboxylic acid. The acid should be one which is liquid at the reaction temperature. The aliphatic saturated monocarboxylic acids having from 2 to 8 carbon atoms in the molecule and free of hydrogen atoms attached to tertiary carbon atoms are particularly advantageous as solvents since they have been found to be relatively stable or inert to oxidation in the reaction system.

The preferred solvent is acetic acid, usually employed in its glacial form. Although acetic acid is preferred, higher homologs such as propionic acid, butyric acid, etc. may be employed. Mixtures of these acids may be employed.

Those skilled in the art will appreciate the volume of solvent employed may be varied over wide limits. The volume of solvent utilized is not critical but typically will be in the range of 0.5 to 10 times the weight of such oxidizable starting material. Where the product is recovered by filtration of the reaction mixture, it may be contaminated by intermediates if the amount of solvent is too small. If the amount is too large, the process is uneconomical.

The process of the invention is carried out in the presence of an oxidation catalyst, and for this purpose any of the known metallic oxidation catalysts may be employed. Suitable oxidation catalysts comprise in general, metals having an atomic weight of from about 50 to about 200 and more particularly compounds of the heavy metals. The metallic oxidation catalyst may be in the form of the elemental metal or may be introduced as the oxide or hydroxide of the metal, but preferably comprises a salt which is soluble or partially soluble in the reaction mixture. Heavy metals, suitable compounds of which may be employed as the catalyst include, for example manganese, bismuth, cobalt, lead, copper, vanadium, tin, chromium, molybdenum, cerium, etc. Mixtures of metals may be employed. Cobalt and manganese are particularly effective as oxidation catalysts. Illustrative examples of particular compounds of heavy metals which may be employed include, for example the salts of saturated or unsaturated carboxylic acids such as cobalt acetate, manganese acetate, cobalt butyrate, manganese linoleate and the like; salts of alicyclic organic acids such as cobalt naphthenate, manganese naphthenate and the like; salts of aromatic carboxylic acids such as manganese benzoate, manganese toluate and the like, etc.

The amount of the catalyst present in the reaction mixture may be varied over wide limits. As little as 0.001% by weight of the catalyst based on the acenaphthene compound undergoing oxidation may be employed and as much as 5% by weight of the catalyst may be used. The amount of catalyst is preferably between 0.01% and about 2% by weight of the oxidizable acenaphthene compound furnished to the process.

The bromine containing compound which is employed as a co-catalyst may be elemental bromine or an inorganic salt of bromine such as ammonium bromide, sodium bromide, potassium bromide and the like, or an organic bromine containing compound such as tetrabromoethane, benzyl bromide, ethyl bromide and the like.

Bromine containing salts of the metallic oxidation catalysts may be employed with equal effectiveness, for example manganese bromide, cobalt bromide, molybdenum bromide and the like, or mixtures thereof.

As to the molecular oxygen-containing gas, there may be employed substantially 100% oxygen gas or gaseous mixtures containing lower concentrations of oxygen. Such mixtures preferably have oxygen contents within the range of about 5% by volume to about 20% or more by volume. As such mixtures there may be employed air or air which has been diluted with a suitable inert gas such as nitrogen, $CO_2$ and the like, or corresponding mixtures prepared from substantially pure gaseous oxygen and such inert diluents may be used.

The temperature which is employed to effect the oxidation of the acenaphthene compounds is effectively in the range of from about 300° F. to about 500° F. and preferably from about 350° F. to about 450° F. At more elevated temperatures the rate of oxidation and the yield of desired product increase, but exceptionally high temperatures may result in non-selective oxidation of the feedstock to carbon dioxide and water. It will be realized that the optimum temperature within the indicated range will depend to a certain extent upon the oxidation catalyst and associated reaction conditions as well as the particular feedstock being treated.

The process of the invention may be conducted at atmospheric or superatmospheric pressure, the minimum pressure being dictated by the requirement that liquid phase reaction conditions be maintained at the particular temperature at which the oxidation is conducted. Depending upon the particular acenaphthene compound oxidized as well as the particular solvent employed, atmospheric pressure may be sufficient to insure that the reactants are substantially present in the liquid phase. Higher pressures may be employed, for example pressures from atmospheric up to about 1500 p.s.i.g. (pounds per square inch gauge). The pressure in the reaction vessel may be adjusted so that at the operating temperature, reflux conditions prevail in order that the refluxing solvent may aid in the dissipation of reaction heat.

The process of my invention may be carried out batchwise, intermittently or continuously. Where the process is carried out batchwise, the reaction vessel comprises a suitable container having means for controlling temperature and pressure and provided with an inlet for introducing molecular oxygen-containing gas below the surface of the liquid reactants and an outlet for removing inert or unreacted gases and a condenser for removing entrained or volatilized liquid from the gaseous effluent. The acenaphthene compound to be oxidized, for example acenaphthene itself, together with solvent and the desired amount of metallic oxidation catalyst and bromine containing co-catalyst are charged to the reactor. Oxygen, for example air, is passed through the reaction mixture which should be vigorously agitated, for example, by means of the gaseous stream or mechanically by means of a power driven stirrer in order to effect maximum contact of the oxygen with the oxidizable charge.

The temperature is gradually raised from ambient temperature to the operating range, for example up to about 400° F., while maintaining a pressure of from atmospheric to about 1500 p.s.i.g. in the reactor. Appreciable oxidation occurs accompanied by exothermic heat of reaction, and the temperature is controlled to maintain the reaction within the desired temperature range. Unreacted oxygen and inert gases are continuously bled off to maintain the pressure within the desired limits, and the progress of the oxidation reaction may be readily determined by analysis of the off-gases for oxygen content. When the oxygen content of the off-gases becomes constant, for example from 18% to 19% by volume of oxygen in the case of air as the oxidant, the reaction is not terminated but continued for an additional period of from about 0.5 to about 4 hours. During this period, intermediate oxidation products are further converted to the desired naphthalic acid; if the reaction is terminated too soon, relatively little of the desired acid product is obtained.

The reactor contents are then cooled to about room temperature and the precipitated product is separated by filtration and extracted with aqueous caustic solution. On acidification, the desired naphthalic acid is precipitated from the caustic solution and may be further purified, for example by recrystallization from acetic acid. Since the naphthalic acid readily loses water to form the corresponding anhydride, the product recovered on recrystallization will in most cases be the anhydride.

The following examples are offered in illustration of my invention but are not intended as a limitation thereof.

*Example 1*

A mixture of 77 g. (0.5 mol) acenaphthene and 150 g. glacial acetic acid was charged to a tubular reactor provided with gas inlet, overhead condenser and means for heating. To this was added a solution of 0.2 g. cobalt acetate, 0.4 g. of manganese acetate and 0.2 g. of ammonium bromide in 6 ml. of water, and the reaction mixture heated while introducing air beneath the surface at a rate of 0.16 cubic feet/minute. The pressure on the reactor was maintained at 400 p.s.i.g. and the temperature at 400° F. The oxygen content of the off-gases dropped initially to 5% and then rose over a period of about 2 hours to about 19%. The oxidation was then continued at the same temperature and pressure for an additional period of about 0.5 hour, during which time the oxygen content of the exit gases remained essentially constant. A total of 21 cubic feet of air (measured at standard temperature and pressure) was passed through the mixture.

The reactor was then cooled, and the partially solidified contents removed. The product was extracted with aqueous sodium hydroxide at 80° C., filtered, and the filtrate acidified with 5 N hydrochloric acid. The precipitated solids were then filtered, washed with water and dried to give 71 g. of solid melting at 230°–241° C. Crystallization from hot acetic acid in the presence of decolorizing charcoal gave light yellow needles of naphthalic anhydride, M.P. 272–274° C., neutral equivalent 103 (calculated 99). The yield was 72.4%.

*Example 2*

The procedure of Example 1 was repeated, except that the oxidation was conducted for 1 hour and was terminated when the oxygen content of the exit gases first reached 19%. A yield of only 28 g. (28% of theory) of naphthalic anhydride was obtained, while 40 gm. of black solids insoluble in aqueous caustic solution were recovered.

*Example 3*

The procedure of Example 1 was repeated using a charge of 51 g. (0.33 mol) acenaphthene and a weight ratio of 4 parts of acetic acid per part of acenaphthene. The ratio of catalyst to acenaphthene was not changed.

The oxidation was conducted for a total period of 110 minutes. After 50 minutes, the oxygen content of the exit gases reached 19%. The oxidation was continued for an additional hour during which time the oxygen content of the exit gases remained essentially constant. A yield of 49 g. (74% of theory) of naphthalic anhydride was obtained while only 7 g. of black material insoluble in aqueous caustic was obtained.

It will be seen from the above examples that the oxidation of acenaphthene occurs in what is essentially a two-stage manner. In the first stage, oxygen up-take is rapid, and it would be inferred by one skilled in the art that the oxidation is essentially complete when the oxygen content of the exit gases reaches essentially constant value. Example 2 above shows, however, that termination of the reaction at this point results in poor yields of the desired naphthalic acid product, the bulk of the oxidized product being an insoluble, black residue. Only by further oxidation for an additional period of from 0.5 to about 4 hours, during which time oxygen absorption is extremely slow, can the oxidation be effected to obtain substantial yields of pure product.

In view of the foregoing disclosures, variations and modifications of the invention will be apparent to those skilled in the art, and it is intended to include within the invention all such variations and modifications except as do not come within the scope of the appended claims.

I claim:

1. A process for the production of 1,8-naphthalic acid which comprises contacting acenaphthene with molecular oxygen-containing gases in the liquid phase in the presence of a lower saturated aliphatic monocarboxylic acid having from 2 to 8 carbon atoms in the molecule and in the presence of a catalytic amount of a catalyst system consisting essentially of a metal oxidation catalyst in an amount between about 0.01 and about 2% based on the weight of acenaphthene and bromine at a temperature of from about 300° F. to about 500° F. and a pressure of from atmospheric to about 1500 p.s.i.g. for a period of from about 1 to about 4 hours until the oxygen content of the gases in contact with the reaction mixture is essentially constant and thereafter further contacting said reaction mixture with a further quantity of molecular oxygen-containing gases for a further period of from about 0.5 to about 4 hours until no further oxygen absorption occurs and recovering the naphthalene polycarboxylic acid so produced.

2. The process of claim 1 wherein said solvent is acetic acid.

3. The process of claim 2 wherein the ratio by weight of the acetic acid to the aromatic compound is in the ratio of 0.5 to 10 parts of the acid to 1 part of aromatic compound.

4. The process of claim 2 wherein the metallic oxidation catalyst is a mixture of cobalt and manganese compounds.

References Cited in the file of this patent

UNITED STATES PATENTS

| | | |
|---|---|---|
| 2,444,924 | Farkas et al. | July 13, 1948 |
| 2,578,759 | Straley et al. | Dec. 18, 1957 |
| 2,833,816 | Saffer et al. | May 6, 1958 |